United States Patent [19]

Dell-Imagine

[11] Patent Number: 5,157,688
[45] Date of Patent: Oct. 20, 1992

[54] SPREAD SPECTRUM TRANSMITTER FOR DEGRADING SPREAD SPECTRUM FEATURE DETECTORS

[75] Inventor: Robert A. Dell-Imagine, Orange, Calif.

[73] Assignee: Hughes Aircraft Company, Los Angeles, Calif.

[21] Appl. No.: 669,139

[22] Filed: Mar. 14, 1991

[51] Int. Cl.$^5$ .............................................. H04L 9/00
[52] U.S. Cl. ..................................................... 375/1
[58] Field of Search ................. 375/1; 380/34, 35, 31, 380/32, 46

[56] References Cited

U.S. PATENT DOCUMENTS 5,029,180 7/1991 Cowart .................................... 375/1
5,029,181 7/1991 Endo et al. ............................. 375/1

Primary Examiner—Thomas H. Tarcza
Assistant Examiner—David Cain
Attorney, Agent, or Firm—W. K. Denson-Low

[57] ABSTRACT

A spread spectrum transmitter uses simultaneous pseudorandom shifts of the transmitted carrier phase and receive local oscillator phases by 90 or 45 degrees and/or pseudorandom time shifts of the transmitted and receiver chip timing by half a chip duration to limit the coherent integration of carrier and chip rate detectors at an intercept receiver attempting to detect the transmissions. Direct sequence spread spectrum signals are intercepted and identified using an intercept receiver by recovering a spectral line corresponding to their carrier frequency or to their direct pseudo-noise chip rate. The conventional use of a phase shift with a fixed carrier frequency and/or a chip time shift with a fixed chip rate simplifies the design of the intercept receiver because the receiver is optimized to a single carrier frequency and chip rate. However, in accordance with the present invention, changing the frequency of the carrier and the chip rate demands complex changes in the intercept receiver design to implement carrier line recovery and chip linear recovery. This strategy accomplishes the desired reduction in the efficiency of the intercept receiver, and hence provides for low probability of detection.

16 Claims, 2 Drawing Sheets

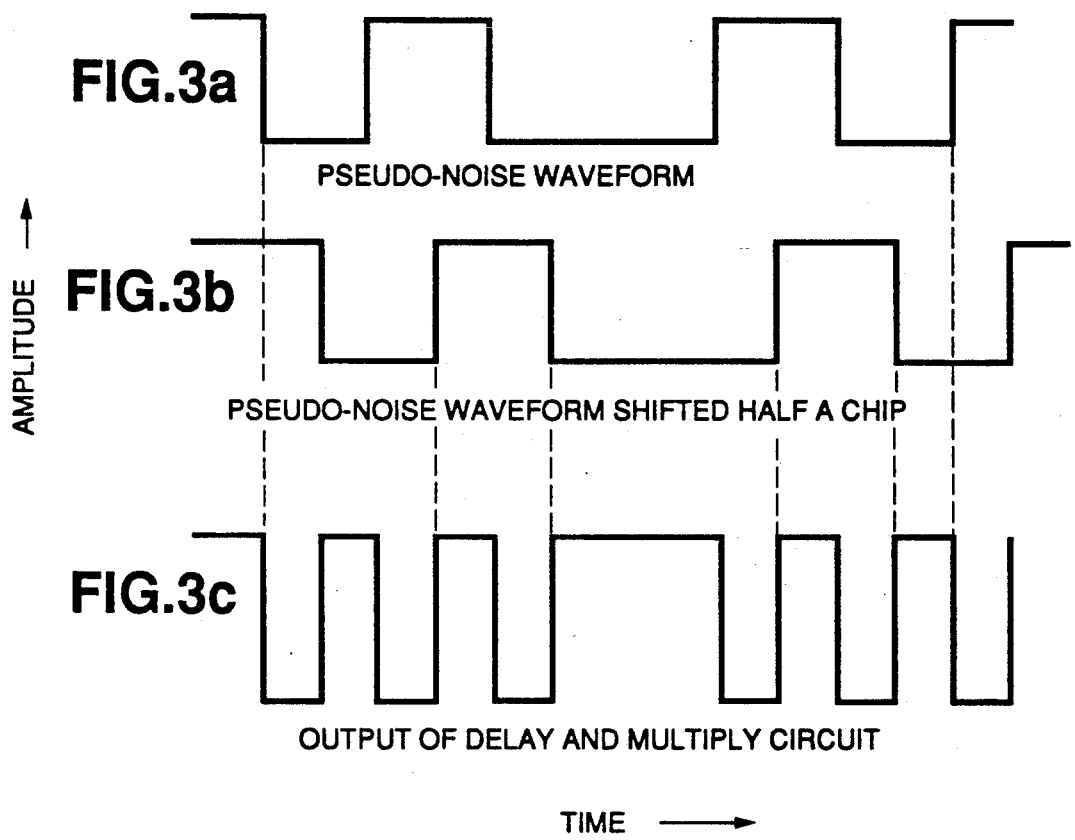
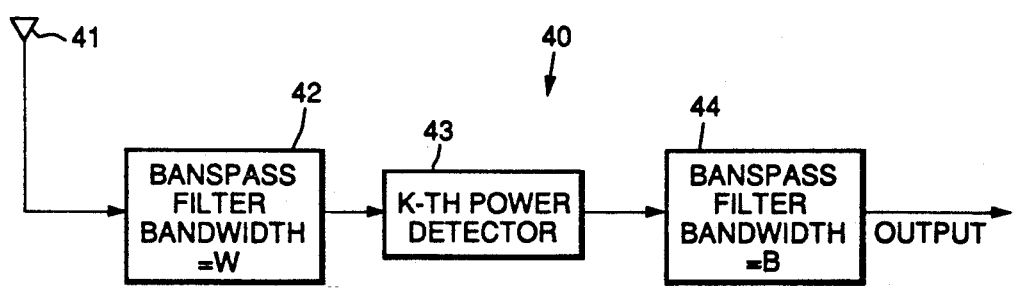
FIG. 4.

SPREAD SPECTRUM TRANSMITTER FOR DEGRADING SPREAD SPECTRUM FEATURE DETECTORS

BACKGROUND

The present invention generally relates to spread spectrum communication, and more particularly, to spread spectrum transmitters and processing methods that provide for degradation of spread spectrum feature detectors and that achieves a low probability of detection.

The state of the art used in intercept receivers switches, or periodically changes, the frequency of the carrier and or the frequency of the chip rate clock to limit the coherent integration. The state of the art is reflected in the book entitled "Spread Spectrum Signal Design AJ/LPE" by David Nicholson, Computer Science Press, 1988 (See Section 4.5, starting at page 179). Implementation of conventional intercept receivers is accomplished in one or two ways: (1) multiple chip matched filters with variable sampling rate to implement the multiple chip rate frequency, and tuneable oscillators to implement multiple carrier frequencies, or (2) a very high sampling rate with firmware-controlled digital chip matched filtering to implement switchable chip rate frequency, and tuneable oscillators to implement the switching carrier frequency. Direct sequence spread spectrum signals are intercepted and identified using an intercept receiver by recovering a spectral line corresponding to their carrier frequency or to their direct pseudo-noise chip rate.

It is an objective of the present invention to provide a spread spectrum transmitter that limits spread spectrum waveform detectability by such intercept receivers and thus provides for a low probability of detection utilizing only phase jitter of a single chip rate and/or a single carrier.

SUMMARY OF THE INVENTION

The spread spectrum transmitter and method of the present invention uses simultaneous pseudorandom shifts of the transmitted carrier phase and receive local oscillator phase by 90 or 45 degrees, for example, and/or pseudorandom time shifts of the transmitted and receiver chip timing by multiples of a small fraction of the chip duration to limit the coherent integration of carrier and chip rate detectors at an intercept receiver. The conventional use of a phase shift with a fixed carrier frequency and/or a chip time shift with a fixed chip rate simplifies the design of the intended receiver because the receiver is optimized to a single carrier frequency and chip rate. However, in accordance with the present invention, changing the phase of the carrier and the phase of the chip signal spreads the recovered spectral line of the carrier and chip tracking. This strategy accomplishes the desired reduction in the efficiency of the intercept receiver, and hence provides for low probability of detection.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIGS. 3a–3c show waveforms of the chip rate detector of FIG. 2; and

FIG. 4 shows a conventional carrier detector.

DETAILED DESCRIPTION

Figure 1:
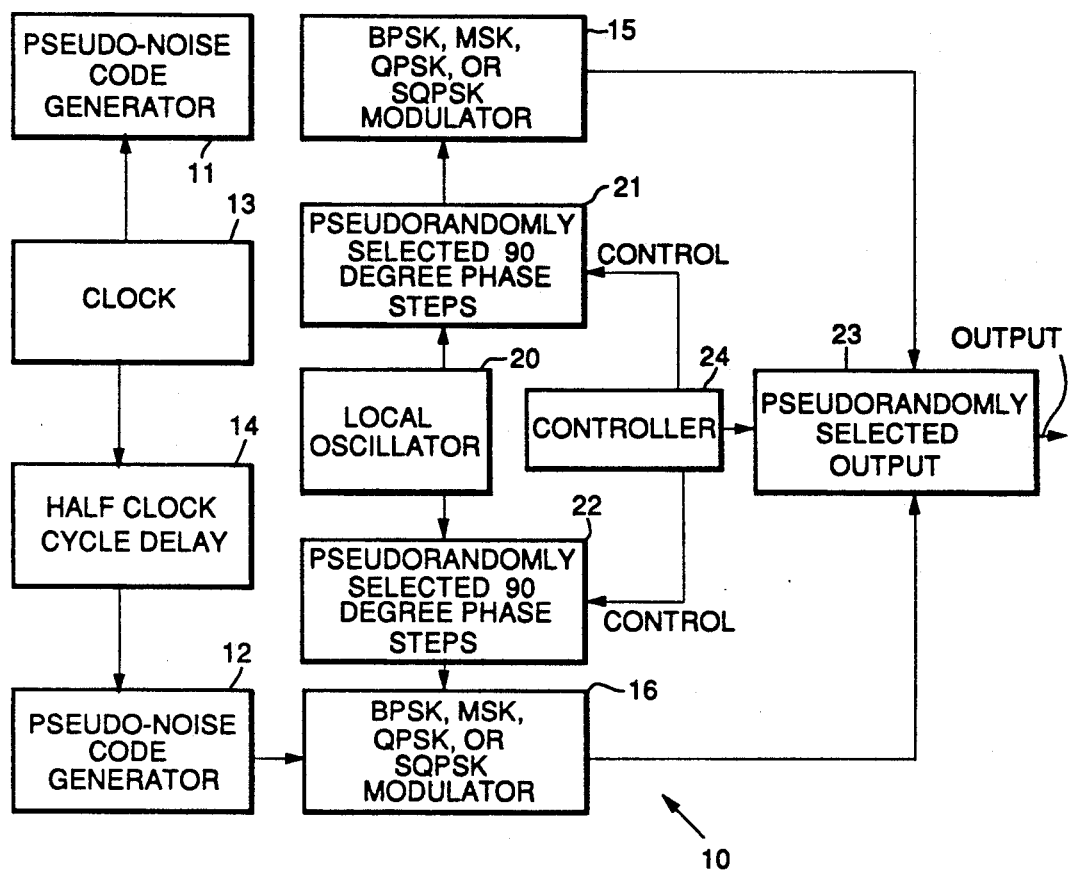
FIG. 1 shows a block diagram of a spread spectrum transmitter that provides for the generation of pseudorandom carrier and chip clock phases in accordance with the principles of the present invention.

Referring to the drawing figures, FIG. 1 illustrates a block diagram of a spread spectrum transmitter 10 that provides for the generation of pseudorandom carrier and chip clock phases in accordance with the principles of the present invention. The spread spectrum transmitter 10 comprises first and second pseudo-noise code generators 11, 12, that are driven by clock signals provided by a clock oscillator 13. A half clock cycle delay 14 is interposed between the clock oscillator 13 and the second pseudo-noise code generator 12. Outputs from the first and second pseudo-noise code generators 11, 12 are coupled to respective first and second modulators 15, 16. The first and second modulators 15, 16 may be adapted to provide bi-phase shift keyed (BPSK), minimum shift keyed (MSK), quadri-phase shift keyed (QPSK) or staggered quadri-phase shift keyed (SQPSK) modulation.

A local oscillator 20 is respectively coupled to each of the modulators 15, 16 by way of first and second step selectors 21, 22, that are adapted to generate pseudorandomly selected 90 degree or 45 degree phase steps, depending upon the modulation employed, under control of a controller 24. Outputs from the first and second modulators 15, 16 are coupled to an output switch 23 that provides for switching between pseudorandomly selected outputs under control of the controller 24.

The present invention provides for the modulation of the phase of the transmitted carrier and the simultaneous modulation of the phase of the local oscillator 20 using 90-degree pseudorandomly selected steps for BPSK or MSK modulation. The step size is selected to be 45 degrees for QPSK or SQPSK modulation. It also includes the switching between the two carriers that are modulated with the same sequence but are offset by one half the chip rate. The spread spectrum transmitter 10 generates the corresponding pseudorandom sequence and also switches simultaneously between two such sequences with offset timing. Both pseudorandom carrier phase modulation and chip timing offset may be used together, or either one may be used separately.

The spread spectrum transmitter 10 may be employed with any direct sequence spread spectrum modulation including BPSK, QPSK, SQPSK, and MSK modulations. In operation, two identical direct sequence pseudorandom code signals are applied to the same sinusoidal carrier, one offset from the other by half a chip time. The output switch 23 synchronously switches between these two outputs under the control of pseudorandom logic in the controller 24. The switching rate is selected to limit the length of constant time offset segments available to intercept receivers, such as the one shown in FIG. 2. In a similar way, the carrier phase may be pseudorandomly shifted over four 90 degree states, or eight 45 degree states, to reduce the sensitivity of the carrier line intercept receiver shown in FIG. 4.

There is no loss in efficiency in the reception process at an intercept receiver designed to receive the waveforms generated by the spread spectrum transmitter 10, so long as the intercept receiver performs the pseudorandom phase modulation and time modulation processes in synchronism with the received waveform. Such synchronization is a normal requirement for spread spectrum reception and does not impose any special requirement.

Figure 2:
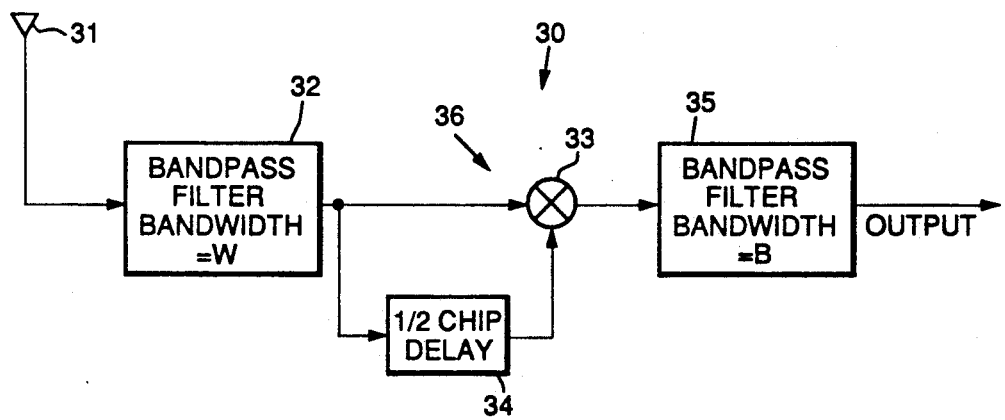
FIG. 2 shows a conventional chip rate detector.

However, the pseudorandom jitter of the time phase of the direct sequence spread spectrum transmitter 10 shown in FIG. 1 is effective against a conventional chip rate detector 30 of the type shown in FIG. 2. The chip rate detector 30 comprises an antenna 31, that is coupled to a first bandpass filter 32 whose bandwidth is W. The output of the first bandpass filter 32 is directly coupled to a combiner or multiplier 33 and is delayed by a ½ chip delay in a delay circuit 34 and applied to a second input of the combiner 33. The combiner 33 and the delay circuit 34 together comprise a delay and multiply circuit 36. The output of the combiner 33 is coupled to a second bandpass filter 35 whose bandwidth is B, and from which the output of the chip rate detector 30 is taken. The front end bandwidth of the first bandpass filter 32 is normally chosen to be large enough to guarantee transmission frequency coincidence. It is often much larger, so that the input RF signal to noise ratio can be as small as $-20$ dB to $-40$ dB (i.e., 0.01 to 0.0001 numeric).

The heart of the chip rate detector 30 is the delay and multiply circuit 36, comprising the the multiplier 33 and ½ chip delay circuit 34 shown in FIG. 2 whose waveform timing is shown in FIGS. 3a–3c. The delay and multiply circuit 36 provides a sinusoidal carrier at the chip rate. The first two waveforms of FIGS. 3a and 3b show a short segment of a pseudorandomly modulated carrier envelope and the same signal delayed half a chip time. The third waveform of FIG. 3c shows the product of the two signals. This third waveform shows that the product of the first two waveforms is comprised of a superposition of a periodic signal and an aperiodic signal. The spectrum of the periodic signal contains spectral lines which are detected by the chip rate detector 30 shown in FIG. 2.

Returning to FIG. 2, the second bandpass filter 35 having bandwidth B integrates the spectral line at the chip rate frequency, provided that the reconstructed chip rate carrier has a constant phase over a duration 1/B. In this case, the detected signal to noise ratio $(S/N)_0$ is given by $(S/N)_0 = 2/(\pi)^2 ((S/N)_{rf})^2 W/B$, where $(S/N)_{rf}$ is the RF signal to noise ratio.

The effect of the pseudorandom chip timing shift is to break up the coherence of the reconstructed chip waveform, so that the bandwidth B of the second bandpass filter 35 must be much wider than the reciprocal of the message duration. If the message contains M shifts, then the bandwidth B must be widened to M*B and the signal to noise ratio is reduced by 1/M or $10* \log_{10}(M)$ in dB.

Even if the chip rate detector 30 is aware of this modification and uses the wider first bandpass filter 32 followed by an envelope detector and a DC integrator for postdetection integration, the loss in gain can be made as large as the square root of M or $5* \log_{10}(M)$ in dB for large M. Such a large loss effectively defeats the intercept receiver.

FIG. 4 shows a configuration for a reconstructed carrier line square law detector 40 against which the present invention is also effective. The square law detector 40 comprises an antenna 41, that is coupled to a first bandpass filter 42 whose bandwidth is W. The output of the first bandpass filter 42 is directly coupled to a Kth power detector 43 to a second bandpass filter 44 whose bandwidth is B, and from which the output of the chip rate detector 40 is taken. The square law detector 40 is effective in recreating a carrier waveform for BPSK or MSK modulations, while a fourth power detector is required for QPSK or SQPSK modulation. A first bandpass filter 42 with bandwidth W must be wide enough to guarantee frequency coincidence with the received carrier and may result in low RF signal to noise ratios. The bandwidth of the second bandpass filter 44 is set equal to the reciprocal of the message duration. This second bandpass filter 44 isolates the reconstructed carrier waveform.

The square law detector converts BPSK modulation into a carrier waveform at twice the frequency of the BPSK modulation frequency. The square law detector converts MSK modulation into two carrier waveforms at twice the MSK modulation frequency and separated by half the chip rate. A fourth law detector converts QPSK and SQPSK modulation into a carrier waveform at four times the QPSK or SQPSK modulation frequency.

The output signal to noise ratio $(S/N)_0$ of such receivers is given by, respectively:

$(S/N)_0 = ((S/N)_{rf})^2$ W/B, for BPSK and MSK modulation, and $(S/N)_0 = ((S/N)_{rf})^4$ W/B, for QPSK and SQPSK modulation.

Employing the spread spectrum transmitter 10 of the present invention to pseudorandomly shift the carrier in 90 degree steps converts the reconstructed carrier into short segments of carrier with pseudorandom 180 degree steps for BPSK and MSK modulation, while 45 degree shifts accomplish the same thing for QPSK and SQPSK modulations. The result is a reduction in the integration efficiency of the second bandpass filter 44 having bandwidth B.

If a message contains M shifts, then the bandwidth B must be widened to M*B and the signal to noise ratio is reduced by 1/M or $10* \log_{10}(M)$ in dB. Even if designers of the carrier line square law detector 40 are aware of this modification and use a wider bandwidth filter followed by an envelope detector, the loss in gain can be made as large as the square root of M or $5* \log_{10}(M)$ in dB for large M.

Thus there has been described a new and improved spread spectrum transmitter that provides for degradation of spread spectrum feature detectors and that achieves a low probability of detection. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A spread spectrum transmitter comprising:
   a clock oscillator;
   a first pseudo-noise code generator coupled to the clock oscillator;
   a half clock cycle delay coupled to the clock oscillator;
   a second pseudo-noise code generator coupled to the half clock cycle delay;
   a first modulator coupled to the first pseudo-noise code generator;

a second modulator coupled to the second pseudo-noise code generator;

a local oscillator;

first means for pseudorandomly selecting predetermined phase steps coupled to the local oscillator;

second means for pseudorandomly selecting predetermined phase steps coupled to the local oscillator;

output means for providing a pseudorandomly selected output coupled to the first and second means for pseudorandomly selecting predetermined phase steps; and controller means coupled to the first and second means for pseudorandomly selecting predetermined phase steps and to the output means for selecting the pseudorandom output from the transmitter.

2. The transmitter of claim 1 wherein the first and second modulators respectively comprise means for providing bi-phase shift keyed (BPSK) modulation with switched chip rate phase and switched carrier phase.

3. The transmitter of claim 1 wherein the first and second modulators respectively comprise means for providing minimum shift keyed (MSK) modulation.

4. The transmitter of claim 1 wherein the first and second modulators respectively comprise means for providing quadri-phase shift keyed (QPSK) modulation.

5. The transmitter of claim 1 wherein the first and second modulators respectively comprise means for providing staggered quadri-phase shift keyed (SQPSK) modulation.

6. A method of transmitting spread spectrum signals that provides for a low probability of detection by intercept receivers, said method comprising the steps of:

generating a clock signal;

generating a first pseudorandom code in response to the clock signal;

delaying the clock signal by a one half cycle clock delay to provide a delayed clock signal;

generating a second pseudorandom code in response to the delayed clock signal;

modulating the first and second pseudorandom codes using a predetermined modulation to provide first and second modulated pseudorandom codes;

combining the first and second modulated pseudorandom codes to provide an output waveform; and transmitting the output waveform.

7. The method of claim 6 which further comprises the steps of:

generating first and second local oscillator signals;

pseudorandomly shifting the phase of the first local oscillator signal by a first predetermined amount to provide a first phase shifted local oscillator signal;

pseudorandomly shifting the phase of the second local oscillator signal by a second predetermined amount to provide a second phase shifted local oscillator signal;

combining the first phase shifted local oscillator signal with the first modulated pseudorandom code to provide a first modulated and phase shifted pseudorandom code signal;

combining the second phase shifted local oscillator signal with the second modulated pseudorandom code to provide a second modulated and phase shifted pseudorandom code signal;

combining the first and second modulated and phase shifted pseudorandom code signals to provide an output waveform; and transmitting the output waveform.

8. The method of claim 6 wherein the predetermined modulation comprises bi-phase shift keyed (BPSK) modulation.

9. The method of claim 6 wherein the predetermined modulation comprises minimum shift keyed (MSK) modulation.

10. The method of claim 6 wherein the predetermined modulation comprises quadri-phase shift keyed (QPSK) modulation.

11. The method of claim 6 wherein the predetermined modulation comprises staggered quadri-phase shift keyed (SQPSK) modulation.

12. A method of transmitting spread spectrum signals that provides for a low probability of detection by intercept receivers, said method comprising the steps of:

generating first and second local oscillator signals;

pseudorandomly shifting the phase of the first local oscillator signal by a first predetermined amount to provide a first phase shifted local oscillator signal;

pseudorandomly shifting the phase of the second local oscillator signal by a second predetermined amount to provide a second phase shifted local oscillator signal;

combining the first phase shifted local oscillator signal with the first modulated pseudorandom code to provide a first modulated and phase shifted pseudorandom code signal;

combining the second phase shifted local oscillator signal with the second modulated pseudorandom code to provide a second modulated and phase shifted pseudorandom code signal;

combining the first and second modulated and phase shifted pseudorandom code signals to provide an output waveform; and transmitting the output waveform.

13. The method of claim 12 wherein the predetermined modulation comprises bi-phase shift keyed (BPSK) modulation.

14. The method of claim 12 wherein the predetermined modulation comprises minimum shift keyed (MSK) modulation.

15. The method of claim 12 wherein the predetermined modulation comprises quadri-phase shift keyed (QPSK) modulation.

16. The method of claim 12 wherein the predetermined modulation comprises staggered quadri-phase shift keyed (SQPSK) modulation.

* * * * *